CARD HOLDER

Filed June 14, 1967

INVENTOR.
EDWARD R. CHAPUT
BY Frederick C. Lange
ATTORNEY

United States Patent Office 3,452,463
Patented July 1, 1969

3,452,463

CARD HOLDER

Edward R. Chaput, St. Paul, Minn., assignor to Service Record, Inc., St. Paul, Minn., a corporation of Minnesota Filed June 14, 1967, Ser. No. 645,944
Int. Cl. G09f 3/18
U.S. Cl. 40—17 3 Claims

ABSTRACT OF THE DISCLOSURE

A transparent card holder of the type to be mounted in vehicles, such as automobiles and trucks, for securing and displaying a card containing information regarding servicing of the vehicle, in which a bead is provided in the rear wall for holding the card securely against the front wall of the holder and in which an opening is provided in the bottom of the holder to prevent the accumulation of dust and dirt therein.

*Background of the invention*

It has been previously proposed to provide a transparent holder made of a material such as plastic and designed to hold and display a vehicle service record card. Certain problems arise, however, with regard to such a holder. To prevent the loss of the service record card and the information it contains, it is necessary to provide means for securing the card within the holder. It is particularly necessary to secure the card within the holder to prevent its removal by the wind or vibration in a moving vehicle. It has accordingly been proposed to provide a folded card to retain the card within the holder. It has also been proposed to use a complicated form of holder to provide resiliency between the front and rear walls to aid in retaining the card in position.

Such service card holders often have the tendency to accumulate dust and dirt within the card pocket space, and it is desirable to avoid such accumulation, to permit easy and complete insertion of the card within the space, and to maintain visibility of the information contained on the card. The provision of a folded card, such as mentioned above, increases the tendency for dust and dirt to collect within the fold of the card.

*Summary of the invention*

It is an object of the present invention to provide a card holder in which there is adequare means for securing an unfolded card within the holder, and for holding it in contact with the interior surface of the transparent front plate of the holder, without providing a resilient connection between the front and rear walls.

It is a further object of the invention to provide a card holder in which the accumulation of dust and dirt within the holder is reduced.

*Description of the preferred embodiment*

Figure 1:
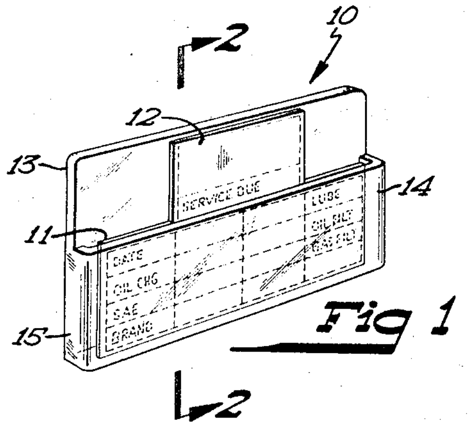
FIGURE 1 is a perspective view of a card holder holding a vehicle service record card and embodying the present invention.

Referring to FIGURE 1, a transparent card holder, indicated in its entirety by general reference numeral 10, is shown holding and displaying a card 11 which contains a record of various information regarding the servicing of the vehicle in which the holder is to be mounted. The card 11 is provided with an upwardly extending tab 12 to be used in the insertion and, more particularly, in the removal of the service card 11 from the holder 10.

The card holder 10 consists of a vertically disposed rear wall 13, and a transparent vertical front wall 14 which are joined by transversely extending side walls 15 and by a base wall 17. An upper portion of the rear wall 13 extends above the front wall 14, and that portion is of a width substantially equivalent to the distance between the lateral extremities of the side walls 15. As shown in FIGURE 1, the portion of the rear wall 13 which extends above the front wall 14 serves as a support for the tab 12 of the service card 11.

Figure 2:
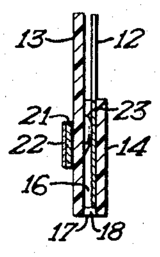
FIGURE 2 is a vertical median sectional view taken on line 2—2 of FIGURE 1 and looking in the direction of the arrows adjacent said line.
Figure 3:
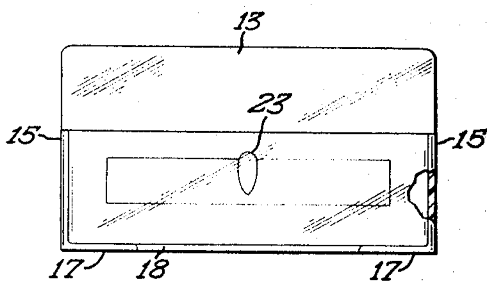
FIGURE 3 is a front elevational view of the card holder shown in FIGURE 1 with the vehicle service record card removed.

As previously explained and as shown in FIGURE 2, the front wall 14 is secured by side walls 15 and base 17 to the rear wall 13 in spaced parallel relationship to form a card pocket 16 into which the service card 11 is inserted. As indicated in FIGURE 3, the base 17 of the holder is formed with a slot 18, which provides open passage from the card pocket 16. The slotted portion 18 in the base of the holder provides a means for dust and dirt to pass out of the card pocket 16, and thereby substantially reduce the tendency for dirt to accumulate in the pocket.

Figure 4:
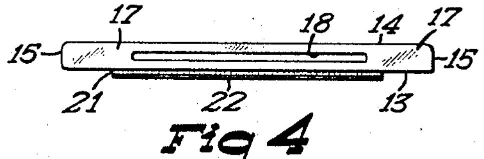
FIGURE 4 is a bottom plan view of the card holder shown in FIGURE 1.

As shown in FIGURES 2 and 4, a strip of resilient material 21 is secured to the exterior surface of the rear wall 13, this strip having a pressure sensitive adhesive coating on the rear face thereof which is covered by a protective covering strip 22. When the card holder is to be mounted in a vehicle, the protective strip 22 is removed to expose the adhesive rear surface of the resilient strip 22, which is then secured to a smooth surface within the vehicle, such as a dash board, to mount the card holder in place in the vehicle.

Referring to FIGURE 2, a rounded projection or raised bead 23 extends from the interior surface of the rear wall 13 intermediate its lateral edges and across the card pocket 16 toward the front wall 14. The bead 23, as will be noted from the drawings, extends vertically and is generally tear-shaped in longitudinal section with the narrow portion of the tear-shaped bead being at the bottom. The bead 23, by reason of this shape, permits easy insertion and removal of the service card 11, while at the same time providing a means of firmly holding the card in contact with the interior surface of the transparent front wall 14. Because of the bead 23, the card 11 is firmly held in position even though the front and rear walls are relatively rigid with respect to each other.

The holder 10 may be formed with the raised bead 23 in contact with the interior surface of the front wall 14, with separation occurring as the card 11 is wedged between the bead and the front wall. The holder may also be formed with a slight space between the bead 23 and the interior surface of front wall 14, but this space must, of course, be a distance less than the thickness of the card 11 to effectively secure the card within the card pocket 16, and to hold it in contact with the interior surface of the front wall.

It may thus be seen that I provide a card holder in which an unfolded card, such as a vehicle service record card, is adequately secured within a card holder, and is held in firm contact with the interior surface of the transparent front plate.

I have further provided a card holder in which the tendency for dust and dirt to accumulate in the card pocket is substantially reduced to thereby permit complete and easy insertion of the card, and to further provide maximum visibility of the information recorded thereon.

While certain specific embodiments of the invention are shown for purposes of illustration, it is to be understood that the scope of the invention is limited solely by the appended claims.

I claim:

1. A card holder comprising a rectangular rear wall, a rectangular transparent front wall secured in parallel spaced relationship to said rear wall to form a pocket space, and a vertically extending bead extending from the face of said rear wall and across said pocket space toward said front wall to secure a card within said space and to hold it in contact with said transparent front wall while permitting sliding insertion and removal of said card into and from said card holder, said bead being tear-shaped in longitudianl section with the narrow portion of the tear-shaped bead being at the bottom to facilitate the insertion and removal of the card from said card holder, and said front and rear walls being interconnected by side walls and a bottom wall.

2. The card holder of claim 1 in which the bottom wall has a slot therethrough extending over more than one-half of the length of said bottom wall to minimize the collection of foreign matter in said holder.

3. The card holder of claim 2 in which a portion of the rear wall extends above the upper edge of the front wall to support a tab on the upper portion of the card further to facilitate removal of the card from the pocket space.

References Cited

UNITED STATES PATENTS

| | | | |
|---|---|---|---|
| 519,256 | 5/1894 | Greene. | |
| 1,347,452 | 7/1920 | Franzen | 40—10 |
| 2,629,952 | 3/1953 | Gazan | 40—17 |
| 2,691,837 | 10/1954 | Gove | 40—10 |
| 3,319,369 | 5/1967 | Severson | 40—10 |

EUGENE R. CAPOZIO, *Primary Examiner.*

W. J. CONTRERAS, *Assistant Examiner.*